United States Patent
Valder et al.

(10) Patent No.: US 10,616,980 B1
(45) Date of Patent: Apr. 7, 2020

(54) SYSTEM AND APPROACH FOR LIGHTING CONTROL BASED ON LOCATION

(71) Applicant: Honeywell International Inc., Morris Plains, NJ (US)

(72) Inventors: Roshan Valder, Bangalore (IN); Murugan Gopalan, Bangalore (IN); Sathish Kumar Vedachalam, Bengaluru (IN); Mukesh Soni, Bangalore (IN); Sakthi Vinayagan, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/383,021

(22) Filed: Apr. 12, 2019

(51) Int. Cl.
*H05B 37/02* (2006.01)
*H05B 33/08* (2006.01)
(Continued)

(52) U.S. Cl.
CPC ....... *H05B 37/0272* (2013.01); *G01C 21/206* (2013.01); *G01C 21/3407* (2013.01);
(Continued)

(58) Field of Classification Search
CPC ............ H05B 37/0272; H05B 37/0218; H05B 33/0845; H05B 37/0245; H05B 37/0254; H05B 33/0854; H05B 33/0857; H05B 33/0863; H05B 33/0842; H05B 37/02; H05B 33/0872; H05B 37/034; H04W 4/33; H04W 4/043; H04W 12/06; H04W 4/80; H04W 4/04; H04W 4/029; H04W 4/021; H04W 4/30; H04W 64/00; H04W 4/023; H04W 4/06; H04W 88/16; H04W 48/10;
(Continued)

(56) References Cited

U.S. PATENT DOCUMENTS

| | | | |
|---|---|---|---|
| 9,345,115 B2 * | 5/2016 | Mohan | G01S 5/0027 |
| 9,526,860 B2 | 12/2016 | Baaijens et al. | |
| 9,585,227 B2 * | 2/2017 | Mohan | H05B 37/0218 |
| 9,585,228 B2 * | 2/2017 | Patel | H05B 37/0218 |
| 9,635,738 B2 | 4/2017 | Joppi et al. | |
| 9,942,967 B2 * | 4/2018 | Chraibi | H05B 37/0227 |

(Continued)

FOREIGN PATENT DOCUMENTS

EP 2529596 B1 7/2014

OTHER PUBLICATIONS

He et al., "Location-Based Illumination Control Access in Wireless Lighting Systems," IEEE Sensors Journal, vol. 15 (10): pp. 5954-5961, Oct. 2015.

*Primary Examiner* — Vibol Tan
(74) *Attorney, Agent, or Firm* — Seager, Tufte & Wickhem LLP

(57) ABSTRACT

A lighting control system that may incorporate a mobile device a signal circuit connected to the mobile device, a lighting controller connected to signal circuit, and one or more lighting fixtures that are controllable connected to the lighting controller. There also may be one or more beacons. The signal circuit may be on the web. The connections may be wire or wireless. The one or more lighting fixtures provide visual light communication to the mobile device. The one or more beacons broadcast signals that are detected for location by the mobile device. One or more controls of the one or more light fixtures, respectively, may appear on a display when the mobile device is capable of receiving light directly from the one or more light fixtures.

19 Claims, 15 Drawing Sheets

(51) Int. Cl.
   *G01C 21/20* (2006.01)
   *G01C 21/34* (2006.01)
(52) U.S. Cl.
   CPC ..... *H05B 33/0845* (2013.01); *H05B 33/0857* (2013.01); *H05B 37/02* (2013.01); *H05B 37/0227* (2013.01); *H05B 37/0281* (2013.01)
(58) Field of Classification Search
   CPC .......... H04W 88/02; H04W 12/00522; H04W 72/04; Y02B 20/48; Y02B 20/36; Y02B 20/445; H04B 10/116; H04B 1/3827; H04L 2012/2841; H04M 1/7253; G01C 21/206; G01C 21/3407
   See application file for complete search history.

(56) References Cited

U.S. PATENT DOCUMENTS

| | | | |
|---|---|---|---|
| 10,039,172 B2 | 7/2018 | Nolan et al. | |
| 10,076,015 B2* | 9/2018 | Bernsen | F21V 33/00 |
| 10,098,074 B2* | 10/2018 | Baker | H04W 76/14 |
| 10,349,500 B2* | 7/2019 | Amrine | H05B 37/0218 |
| 10,382,452 B1* | 8/2019 | Dawes | H04L 63/02 |
| 2016/0337796 A1* | 11/2016 | Pandharipande | H04W 12/02 |
| 2016/0360594 A1* | 12/2016 | Chemel | H05B 37/0227 |
| 2016/0374045 A1* | 12/2016 | Pandharipande | G01S 1/68 |
| 2017/0006694 A1* | 1/2017 | Davis | H05B 37/0263 |
| 2017/0019264 A1* | 1/2017 | Nugent | H04L 12/282 |
| 2017/0127495 A1* | 5/2017 | Mohan | H05B 37/0227 |
| 2017/0265279 A1* | 9/2017 | Chraibi | H05B 37/0227 |
| 2018/0249306 A1* | 8/2018 | Pandharipande | H04Q 9/00 |
| 2018/0359809 A1* | 12/2018 | Sohn | H04W 84/18 |
| 2019/0116645 A1* | 4/2019 | Tiberi | H05B 37/0272 |

* cited by examiner

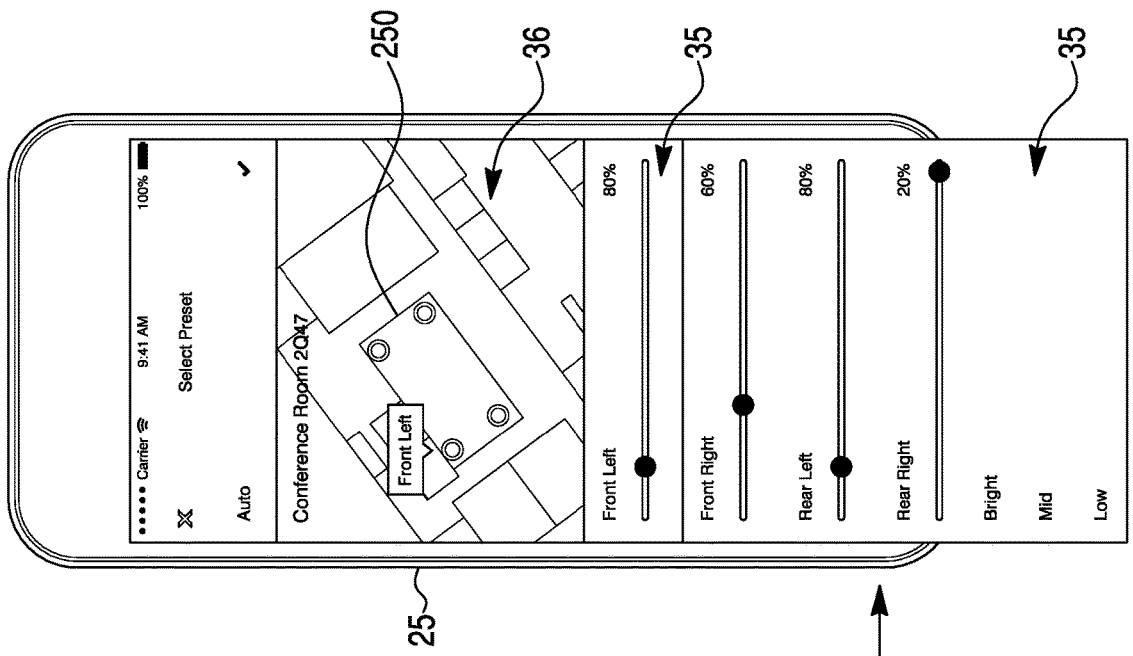
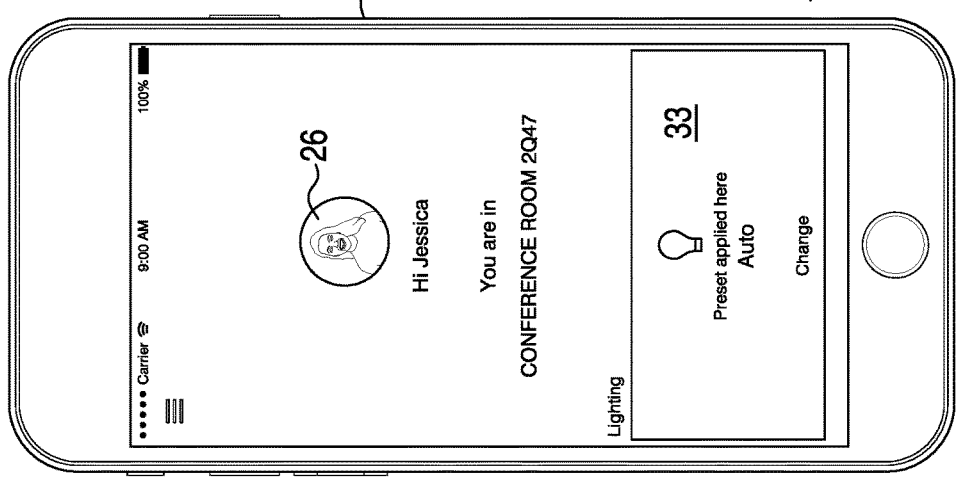
FIG. 6

SYSTEM AND APPROACH FOR LIGHTING CONTROL BASED ON LOCATION

BACKGROUND

The present disclosure pertains to lighting and control of the lighting.

SUMMARY

The disclosure reveals a lighting control system that may incorporate a mobile device a signal circuit connected to the mobile device, a lighting controller connected to signal circuit, and one or more lighting fixtures that are controllable connected to the lighting controller. There also may be one or more beacons. The signal circuit may be on the web. The connections may be wire or wireless. The one or more lighting fixtures provide visual light communication to the mobile device. The one or more beacons broadcast signals that are detected for location by the mobile device. One or more controls of the one or more light fixtures, respectively, may appear on a display when the mobile device is capable of receiving light directly from the one or more light fixtures.

BRIEF DESCRIPTION OF THE DRAWING

FIG. 6 is a diagram where a user may launch the vector navigation application in a controllable light area;

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present system and approach may allow a user to personalize controls in the area that the user is in without the tedious need to find where the switches/controls are located in the area or go through a list of locations in a mobile device navigation application (app). The location may be derived from lighting, Bluetooth, beacons or a GPS-positioning infrastructure.

In order to control lights, the user may do such in one of several ways. One may use physical lighting controls. In this situation, the user may have to locate where the switches are and also figure out which light corresponds to which switch as there are typically lots of controls.

One may use a mobile app. In this situation, the user may have to launch an app and locate the area before being able to control the lights. In an office setup, this can be tedious as there are numerous areas that the user has to search through and select.

Advantages of an application may be noted. Controls for the lights may appear when the user is directly under a controllable light; thus, there is no need to search for controls.

Figure 9:
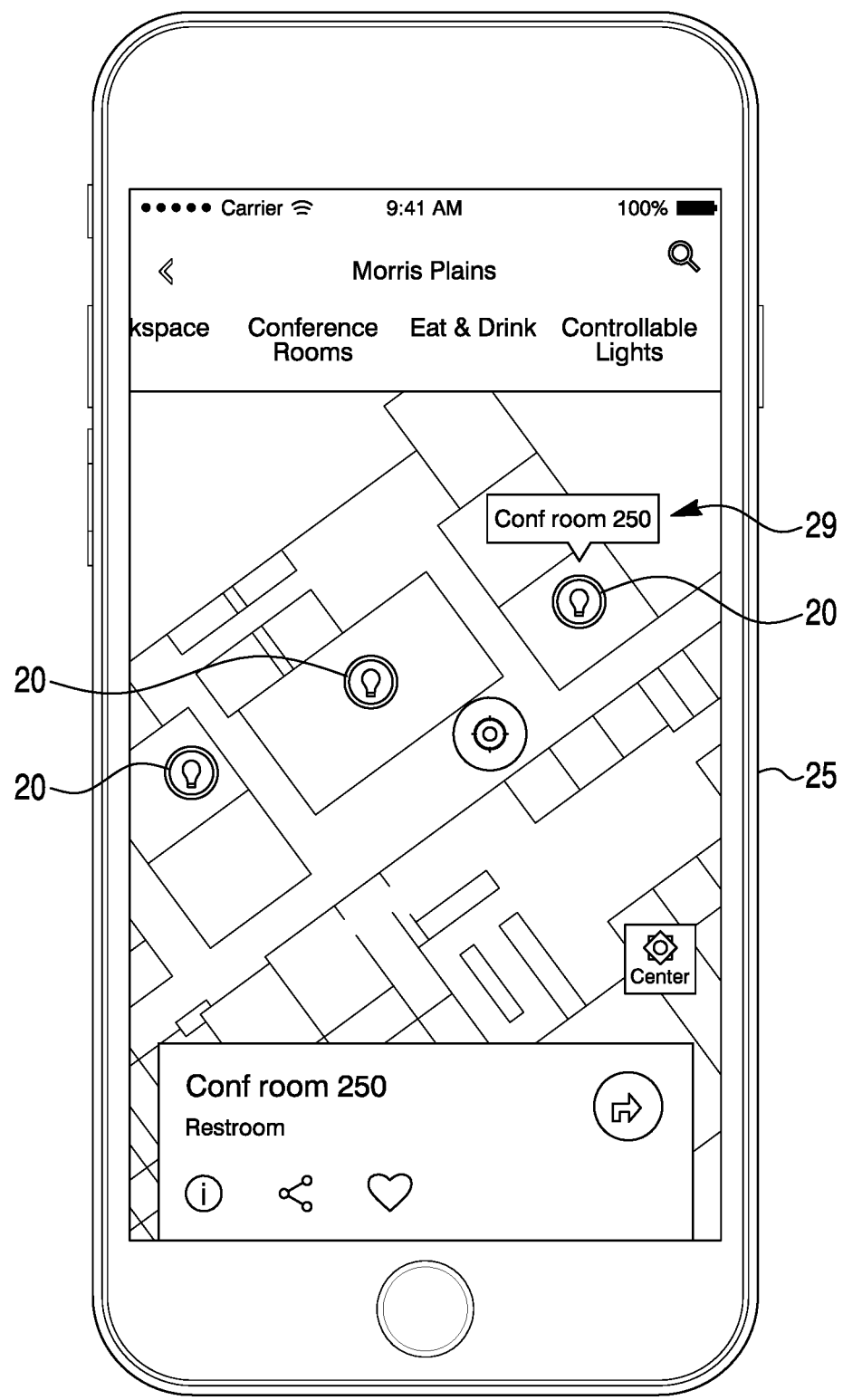
FIG. 9 is a diagram of an enlargement of a mobile device with display portion shown in a diagram of FIG. 4.

There may be improved security as the user is not necessarily able to control lights where he or she is not directly under. However, restricted access to lights remotely may be provided, in a case where a user is not present in that area, through use of a map (FIG. 9).

Figure 14:
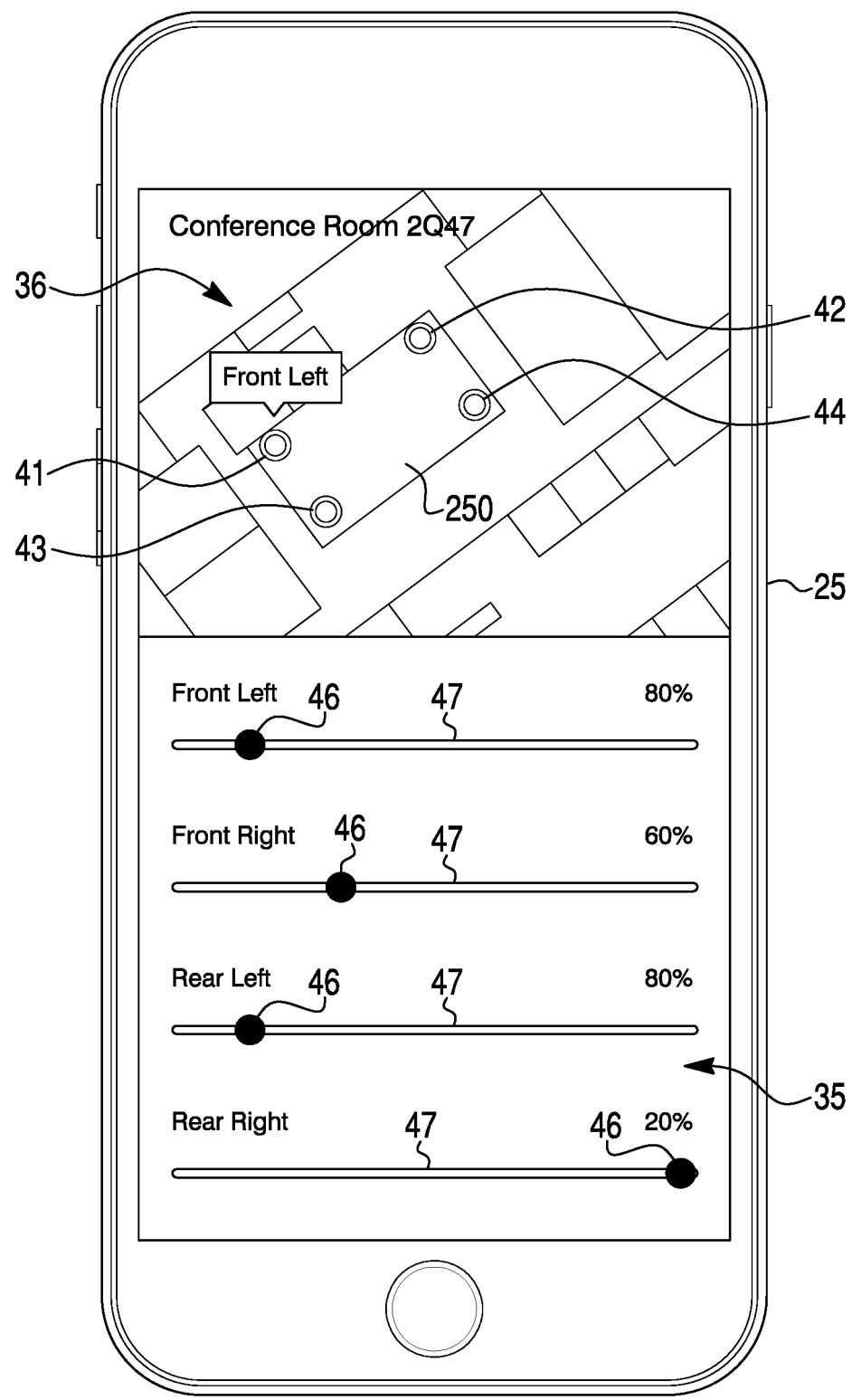
FIG. 14 is a diagram of a room with lights that may be controlled or adjusted individually.

Individual controls of lights may be on a map to view easily which lights are controllable in case of multiple lights in an area (FIG. 14).

The present system and approach may provide a user interface in a mobile application to control lights based on the location of the user, which can remove the tediousness of searching for controls or selecting locations in the app.

A benefit may be an allowance for location-based lighting control in an interface on a mobile app using the lighting infrastructure and others like Bluetooth, GPS, and so on, to control the lights. If the user is not in a location with controllable lights, the controls do not necessarily exist anymore on the user interface.

Moreover, a map-based selection of lights may be used to select individual lights in an area so that the user is able to customize the controls to his or her liking. The user may also be able to see on a map of what area is light controllable as all lights in a space may not be controllable.

The present system and approach may provide an improved occupant experience by allowing occupants to easily personalize the lighting in the space they are in. This may allow one to expand a portfolio of building controls for the occupant, thereby providing the occupant improved user experiences.

The system and approach may relate to a company's vector occupant app, such as one by Honeywell International Inc., and that may be used to expand a portfolio of building controls for the occupant. The app may provide indoor or outdoor navigation, which uses GPS-like technology and an interactive map to help the occupant to find his or her way around via pedestrian walkways at, for example, downtown to a particularly selected building among a complex of buildings. Then the next item for the occupant may be to navigate to a designated place, space or room within the building such as, for instance, a conference room or an office.

Figure 1:
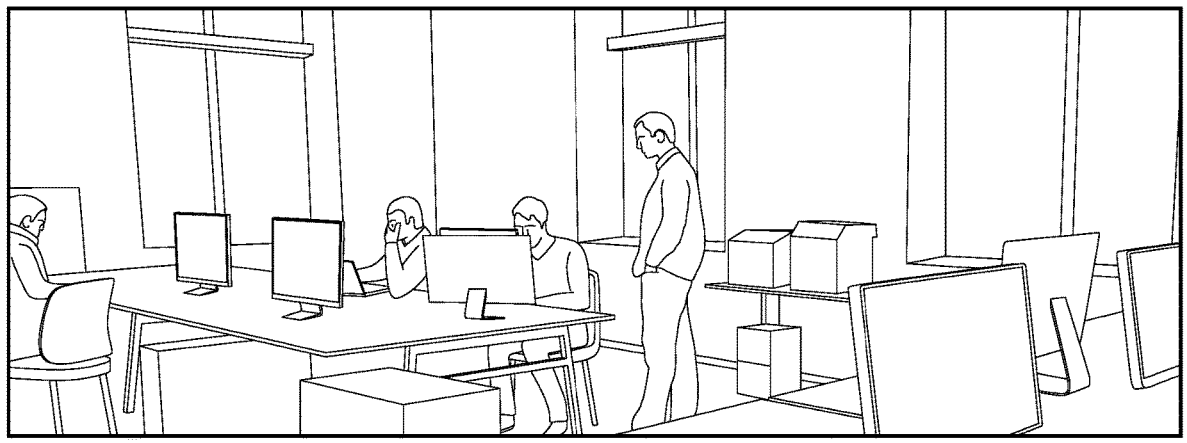
FIG. 1 is a diagram of an illustration of the present system in terms of lighting control in a work space.

FIG. 1 is an illustration of use of the present system in terms of lighting control in a work space for an occupant experience. Different areas of the same space may have different light requirements that change over time. One may manage lighting as needed quickly and easily. It may be light control at one's fingertips. No more searching for switches and/or walking over to a switch board is needed. A mood of the space may be changed as one needs or wants it quickly. Various lighting scenes and presets may be enabled in a certain fashion depending on one's needs or desires.

Figure 2:
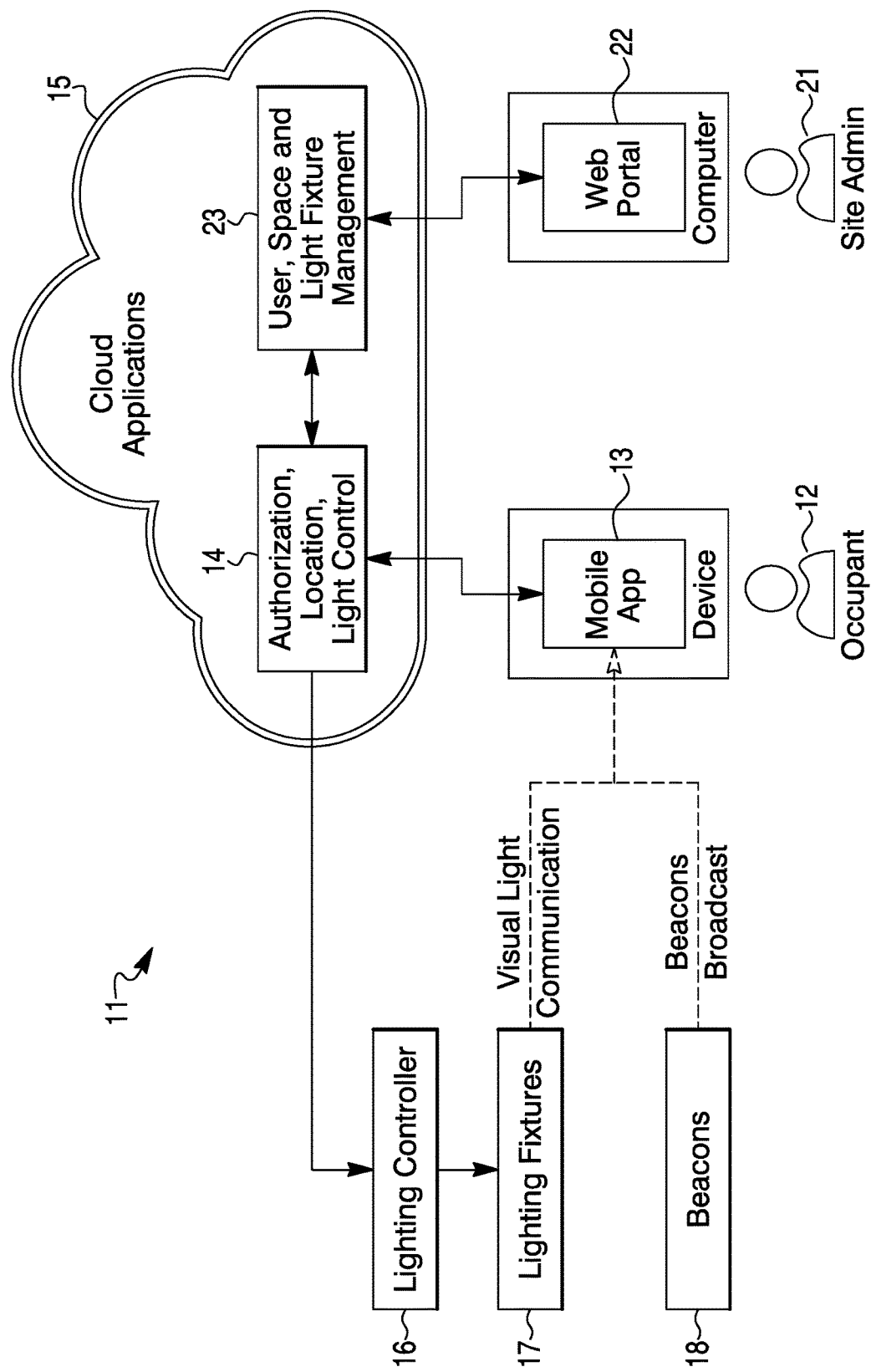
FIG. 2 is a diagram of a component layout of a present system.

FIG. 2 is a diagram of a layout of a present system 11. An occupant 12 may have a device 10 with a mobile app 13. A mobile app 13 of device 10 may provide a location of the occupant along with authorization and light control signals may go to a signal center 14 at a cloud 15 or not at a cloud. From signal center 14, for instance at cloud 15, an output may go to a lighting controller 16. Signals from controller 16 may go to one or more controllable light fixtures 17 situated at a location indicated by mobile app 13 on device 10 of occupant 12.

A visual light communication may go from one or more light fixtures 17 to mobile app 13 providing information, such as status, about one or more light fixtures 17. A set of beacons 18 may emanate signals from its location. The signals may be detected by device 10 and processed with mobile app 13 to provide a location of device of occupant (user) 12 and/or the light fixtures 18, as a broadcast to mobile app 13. Other approaches may be utilized for determining locations of the one or more light fixtures 17 and device 10.

A site administrator 21 may operate via a web portal 22 at a non-mobile or mobile computer, work station or device with signals to a signal center, module or circuit 23 at cloud 15, and signals from center, module or circuit 23 to portal 22, indicating user, space, and light fixture management information. Signals may travel between signal center, module or circuit 14 and signal center, module or circuit 23, with user, space and light fixture management information. This information may go from signal center 14 to lighting controller 16, which can provide control signals to the one or more lighting fixtures 17.

Figure 3:
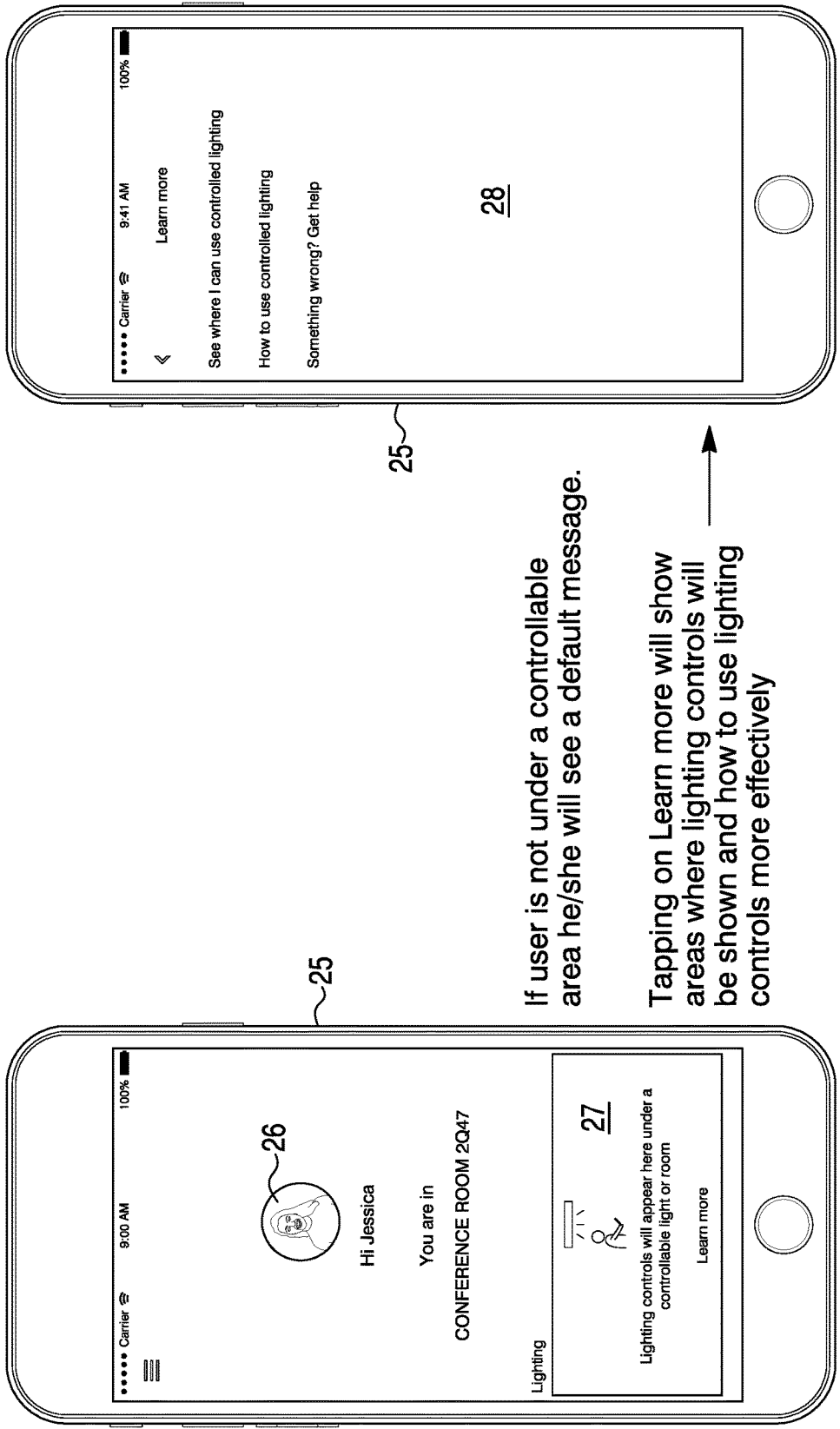
FIG. 3 is a diagram of a mobile phone of a user who may launch a navigation vector application while not in controllable light area.
Figure 7:
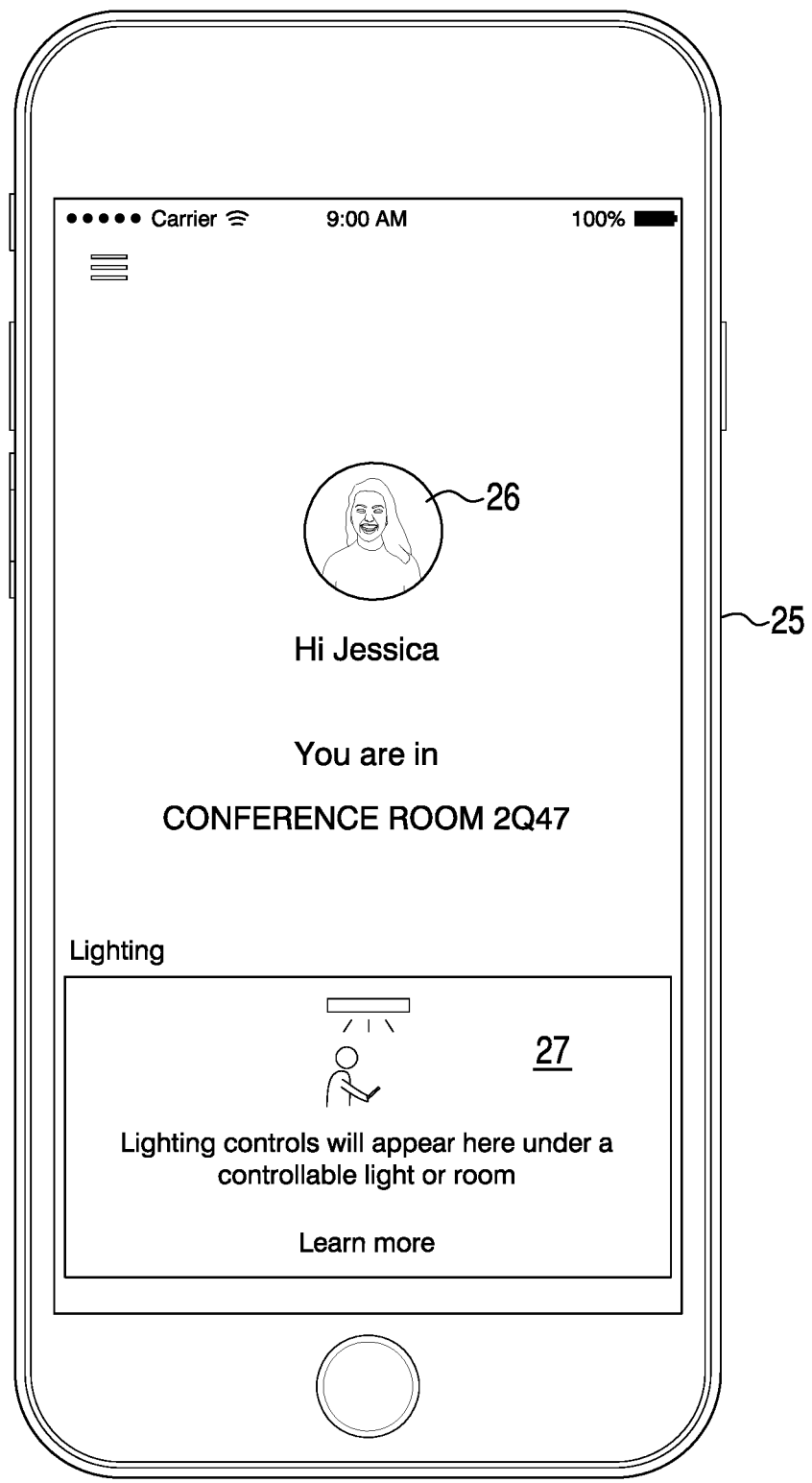
FIGS. 7 and 8 are enlarged diagrams of a mobile device with display portions in FIG. 3.
Figure 8:
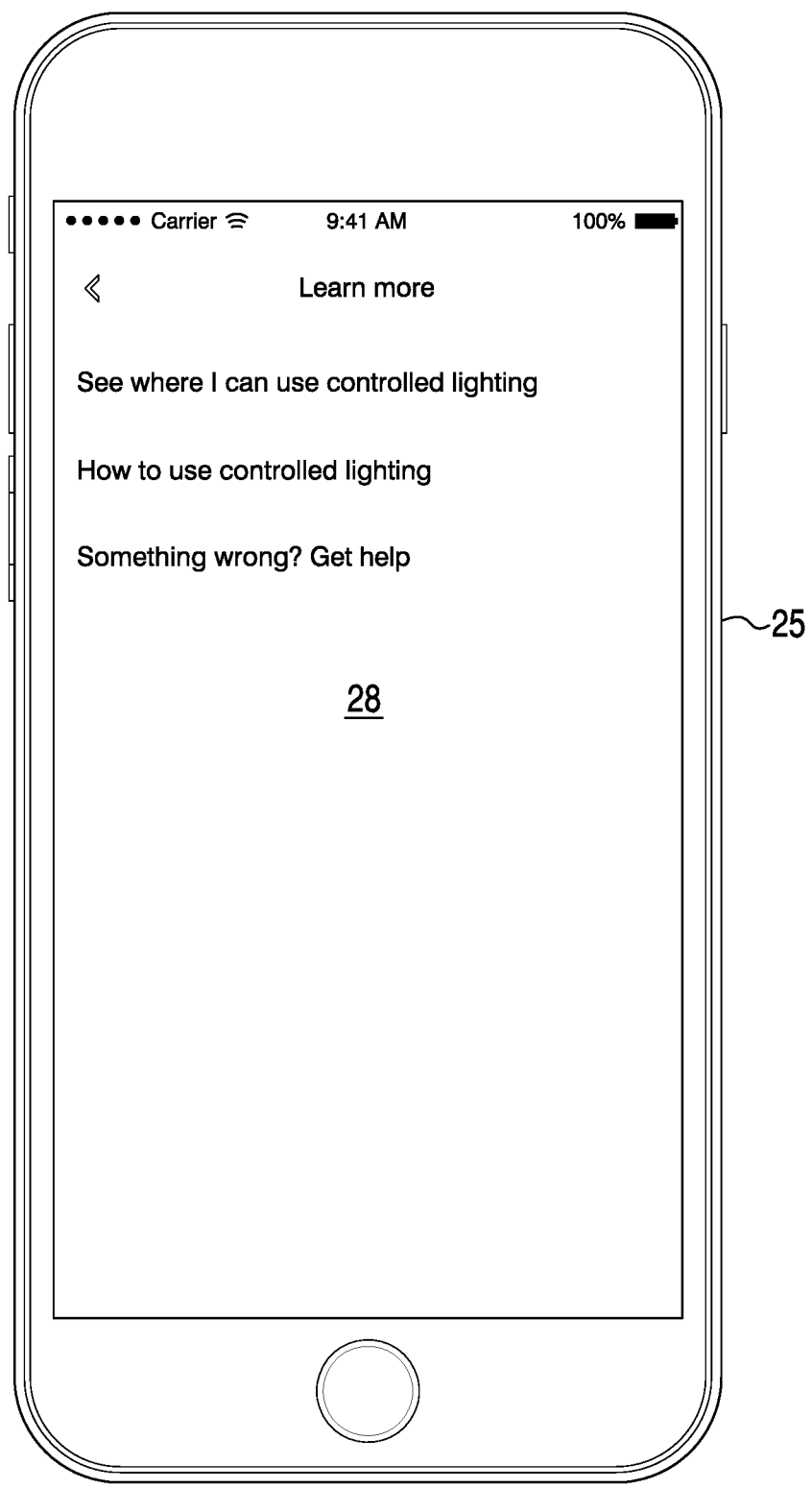

FIG. 3 is a diagram of a mobile phone 25 of a user 26, for example, Jessica, who may launch a navigation vector app while not in controllable light area such as a conference room 2Q47 designated herein as room 250. If user 26, for instance Jessica, is not under a light controllable area, she may see a default message that indicates that lighting controls may appear here (i.e., area or display portion 27) when under a controllable light or a room with controllable lights. Tapping on "Learn more" in display portion 27, may show an area or display portion 28 where lighting controls will be shown and how to use the lighting controls more effectively than without the present system and approach. In display portion 28 that shows a label "Learn more" on a display of mobile device or phone 25, may show options for getting knowledge about the present lighting system. The options may include examples of "See where I can use controlled lighting", "How to use controlled lighting", and "Something wrong? Get help". User 26 may tap on any one of these options. Other options may be displayed on display portion 28. Enlarged diagrams of mobile device 25 with display portions 27 and 28 are shown in FIGS. 7 and 8, respectively.

Figure 4:
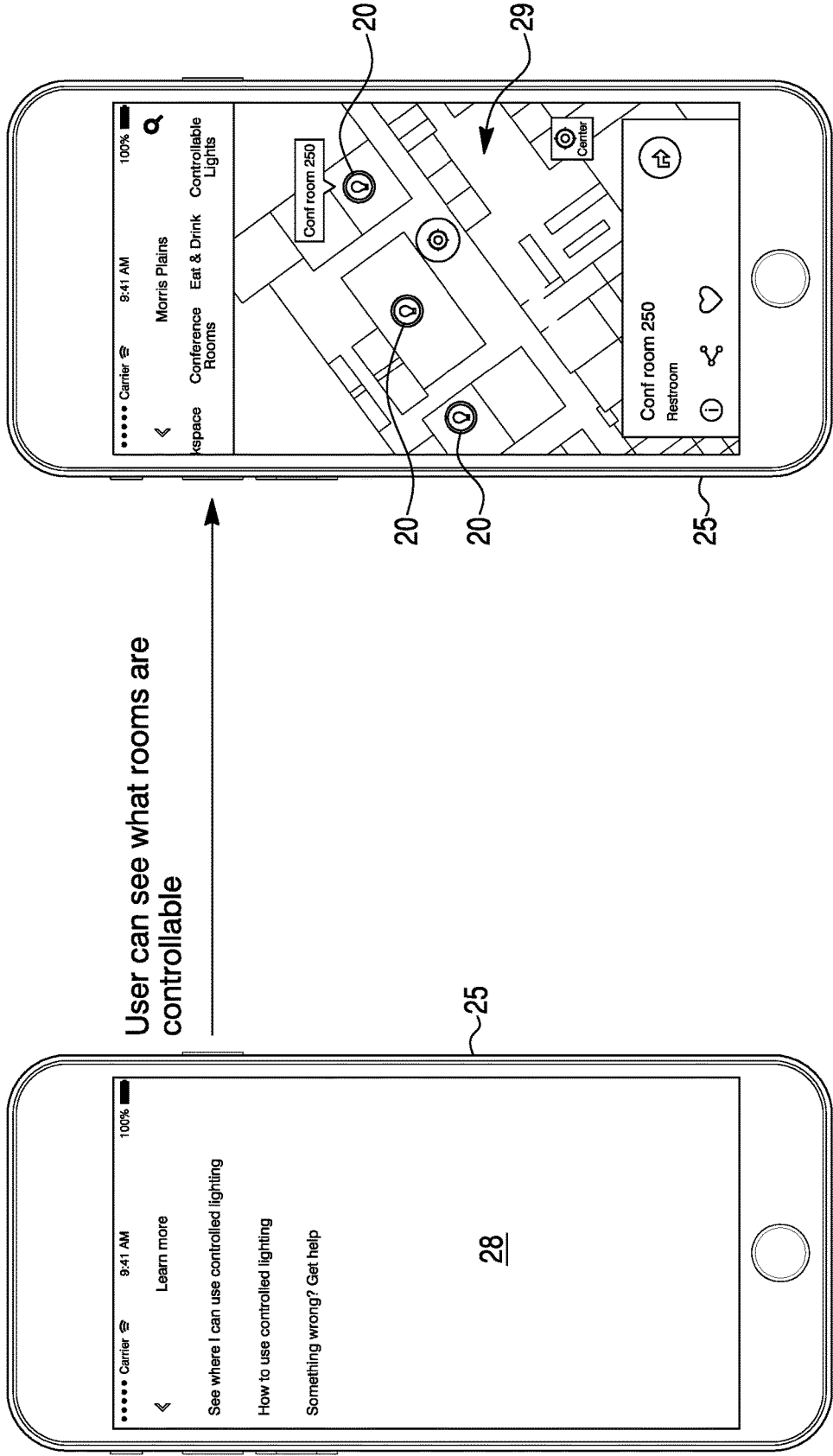
FIG. 4 is a diagram of a user launched vector not in a controllable light area.

FIG. 4 is a diagram of a user 26 launched vector not in a controllable light area. User 26 may go from display portion 28 on device 25 to a display portion 29 on device 25 to see what rooms are controllable in terms of lights, according to symbols 20. An enlargement of device 25 with display portion 29 is shown in a diagram of FIG. 9. Controllable lights, for example, may be shown to be in a conference room 250 in display portion 29 of the display of mobile device 25, as indicated by symbol 20. Controllable lights may be indicated in other rooms or spaces in display portion 29 even when device 25 is not in a controllable light area.

Figure 5:
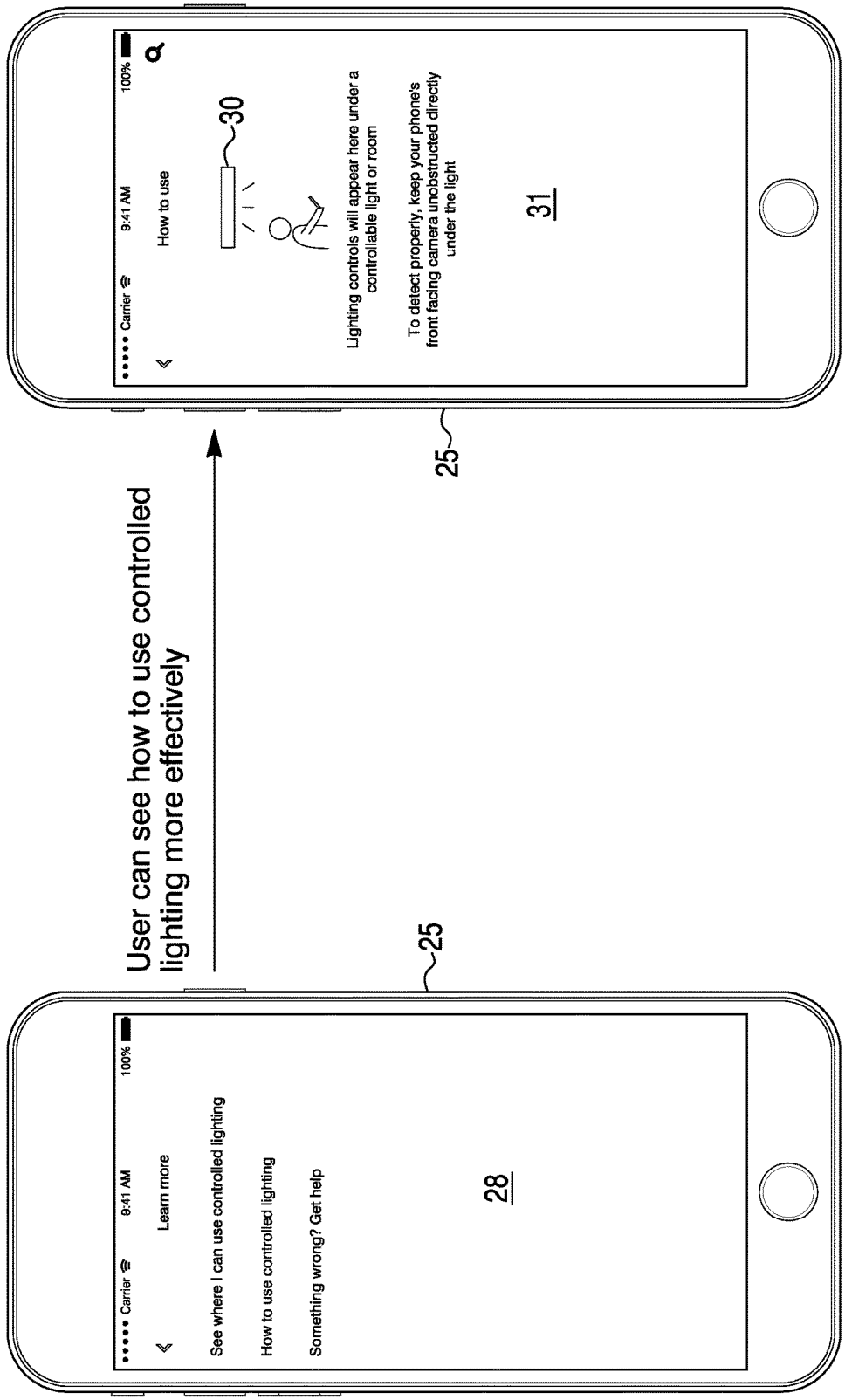
FIG. 5 is a diagram of where user launches a vector navigation application on a mobile device not in a controllable light area.
Figure 10:
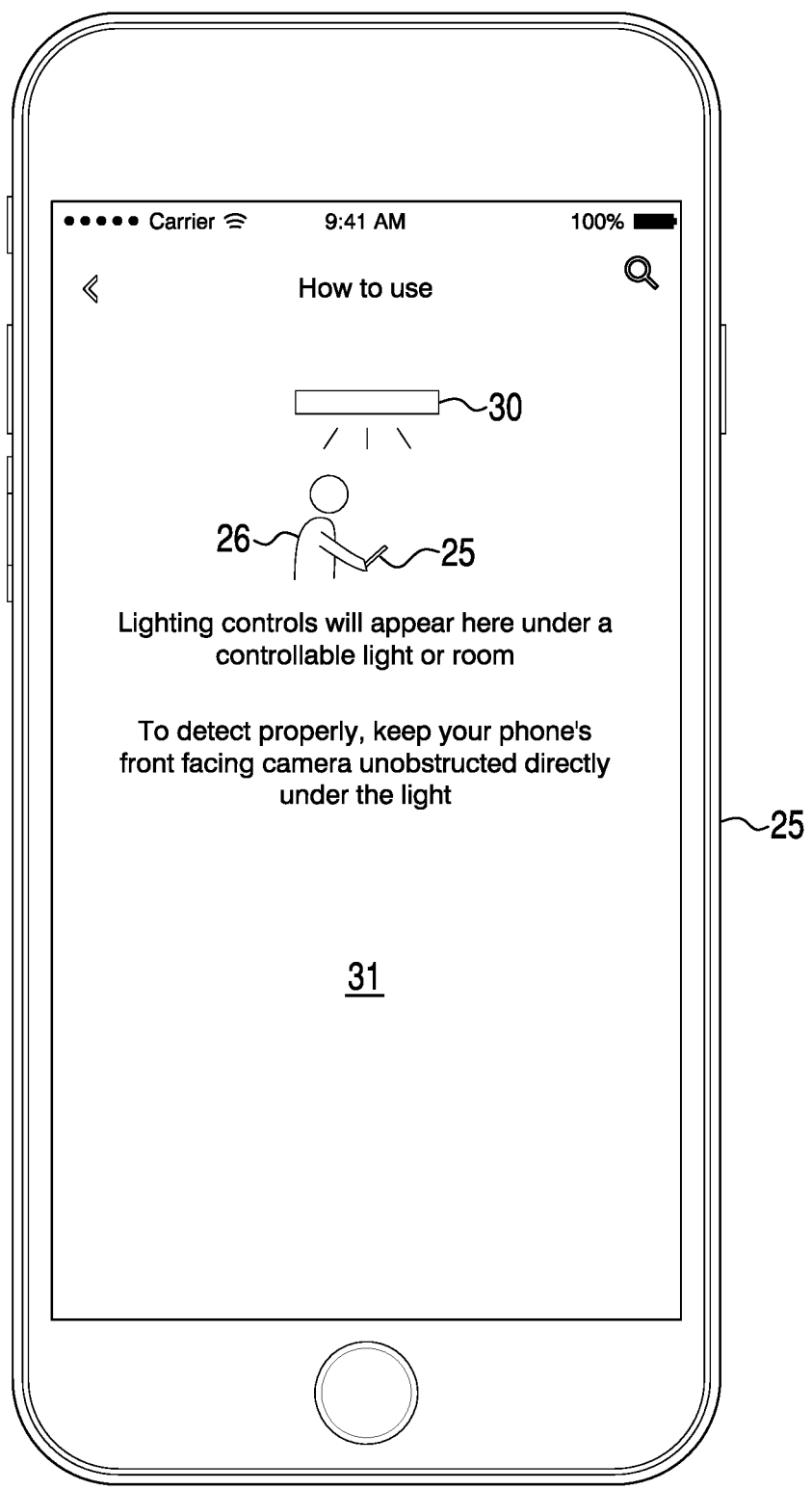
FIG. 10 is a diagram of an enlargement of a display portion on a mobile device in a diagram of FIG. 5.

FIG. 5 is a diagram of where user 26 launches a vector navigation app on device 25 not in a controllable light area. User 26 may see on a display portion 31 how to use controlled lighting more effectively. Display portion 31 indicates that lighting controls may appear under a controllable room or light 30 situation. Display portion 31 may also indicate that to detect properly, one is to keep the phone front camera of device 25 facing unobstructed directly toward a light 30. An enlargement of display portion 31 on device 25 of FIG. 5 is shown in a diagram of FIG. 10.

Figure 11:
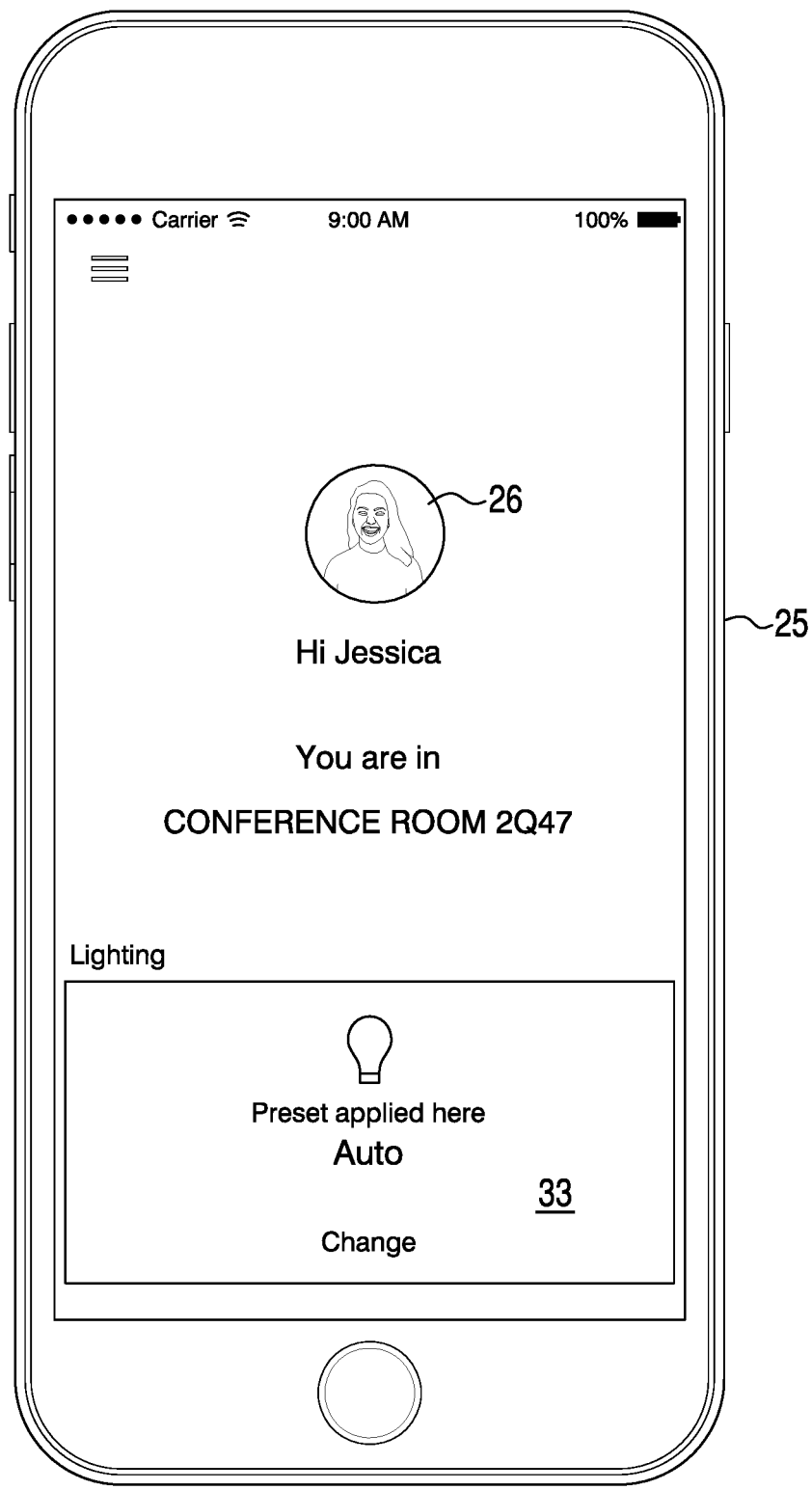
FIG. 11 is a diagram of an enlargement of where a user may launch a vector navigation application in a controllable light area in a diagram of FIG. 6.

FIG. 6 is a diagram where user 26 may launch the vector navigation app in a controllable light area. Tapping "Change" in display portion 33 of mobile device 25 may give an ability to user 26 to change a preset and control each light individually as shown in display portions 35 and 36 of mobile device 25. An "auto" in portion 33 of the display may be tapped. Portion 33 for lighting along with selections "auto" and "change" is shown enlarged in a diagram of FIG. 11.

Figure 12:
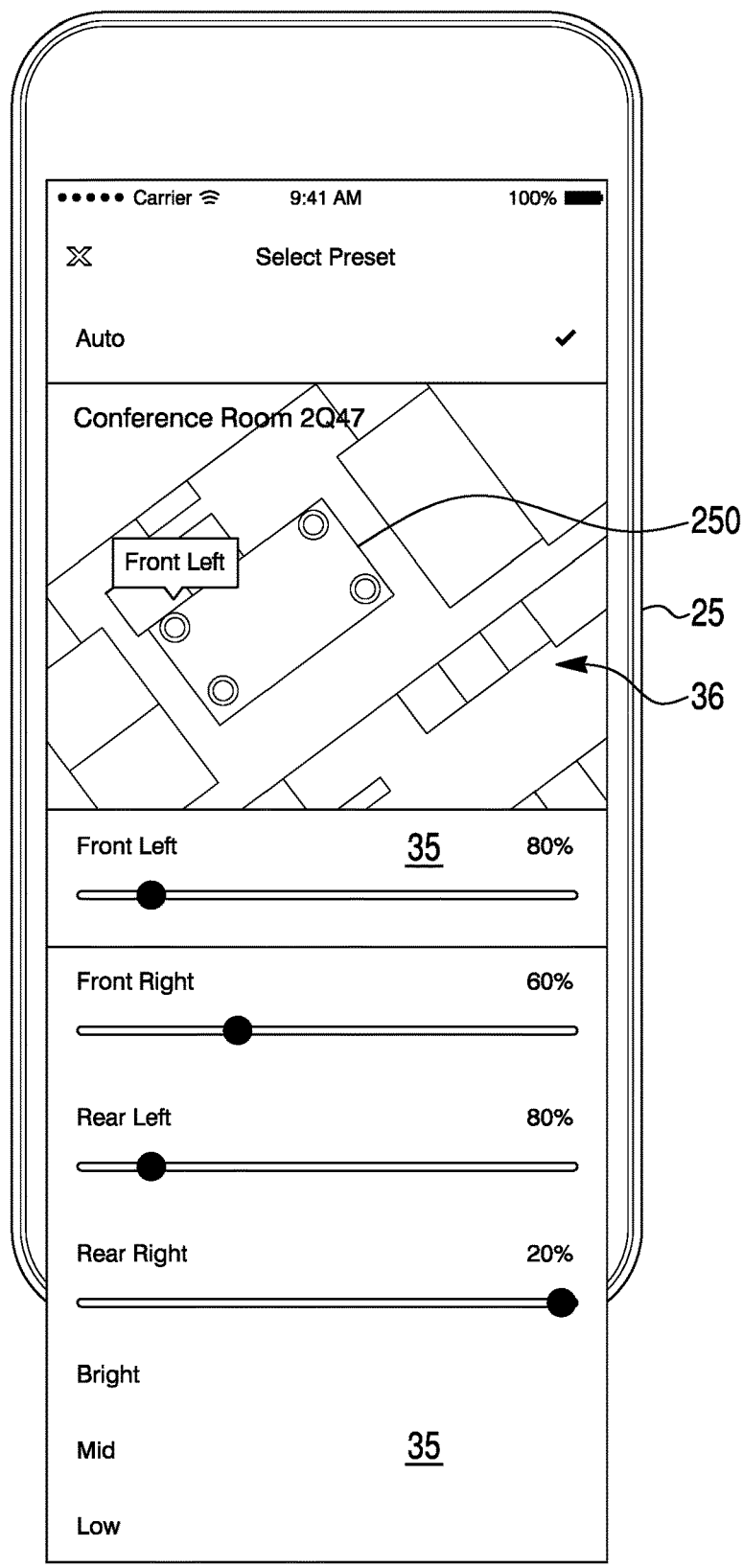
FIG. 12 is an enlarged diagram an extended portion beyond the display of a mobile device showing labels of which may be scrolled up in conjunction with adjustable presets as shown in a diagram of FIG. 6.
Figure 13:
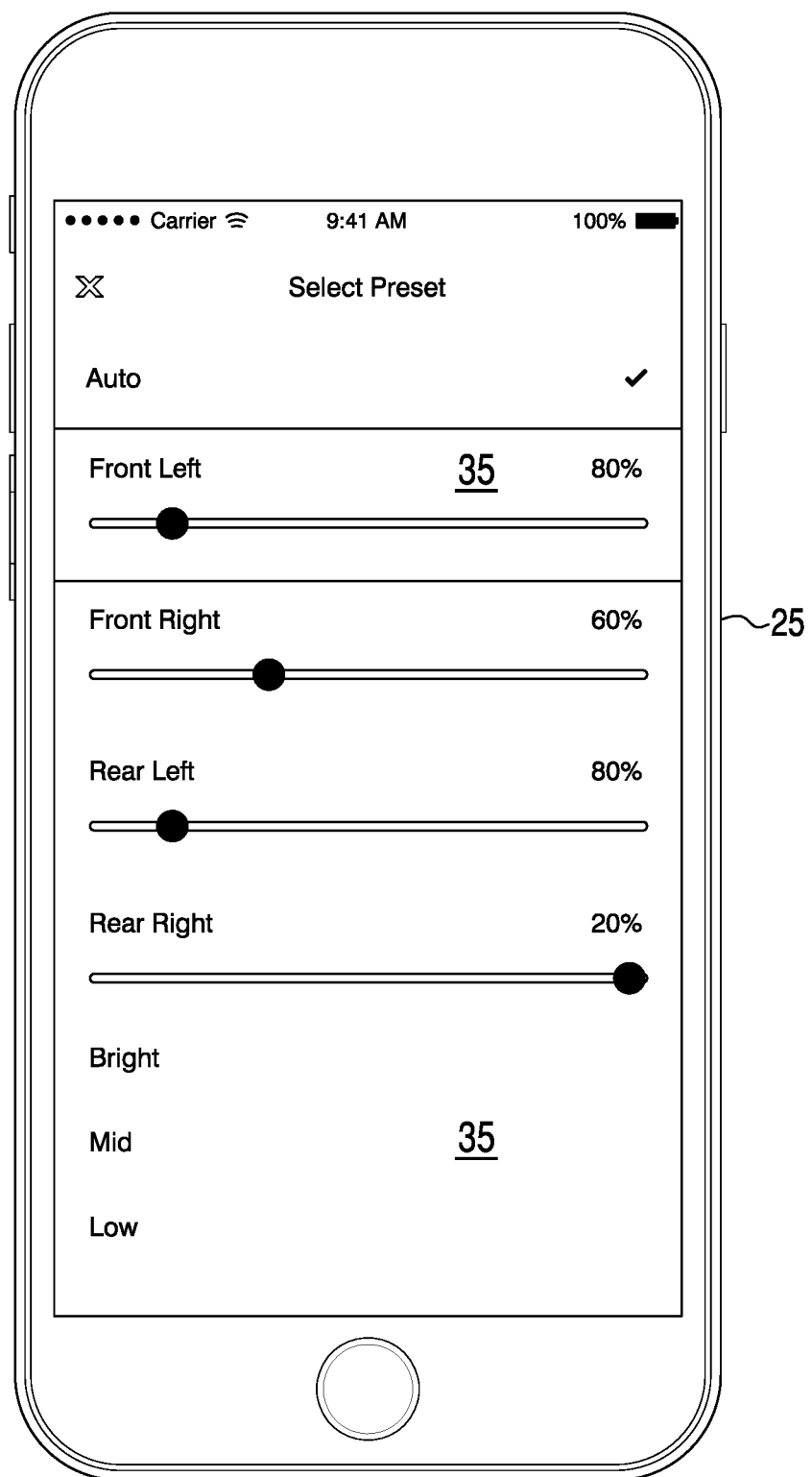
FIG. 13 is a diagram of the labels along with the presets completely on the display portion of a mobile device.

Display portions 35 and 36 are shown enlarged in a diagram of FIG. 12. An extended portion 35 beyond the display of mobile device 25 is shown for illustrative purposes to show the labels of "Bright", "Mid" and "Low", which may be scrolled up in conjunction with adjustable presets situated above the labels on the display. FIG. 13 is a diagram of the labels along with the four presets on the display portion 35 of mobile device 25. The presets are for adjusting controlled lights in an example Conference Room 2Q47, designated as a room 250 in the diagram of FIG. 4. Adjustments may pertain to other properties of the controlled lights.

FIG. 14 is a diagram of enlargement showing display portions 35 and 36 of device 25 in FIG. 6 with an illustration of room 250 along with individually controllable front left light 41, front right light 42, rear left light 43 and rear right light 44. The brightness of each light may be controlled or adjusted from zero percent to one hundred percent. The settings may be changed, or instance, by sliding a button 46 on a slide bar 47, for example, with a finger or stylus on a touch screen, or with some other way for adjusting the preset values for each of the lights. There may be any number of lights in a room, such as room 250, along with various graphical or other entry techniques for adjusting the lights. There may also be uncontrolled lights in a room with the controlled lights. Lights of any kind may be arranged in any pattern. The lights may be smart or non-smart, and be able to emanate of different colors (wavelengths), vary in intensity (brightness), dispersion (focus), dynamically change colors, affect other properties of the light, and so forth.

The adjustments of brightness of the lights may retain preset settings from a previous time that they were adjusted, or one or more lights may have default values that override a previous preset adjustment. The presets, settings or adjustments may be controlled or provided at places remote from room 250 or other room or space with a mobile device at a location outside the room or space.

Figure 15:
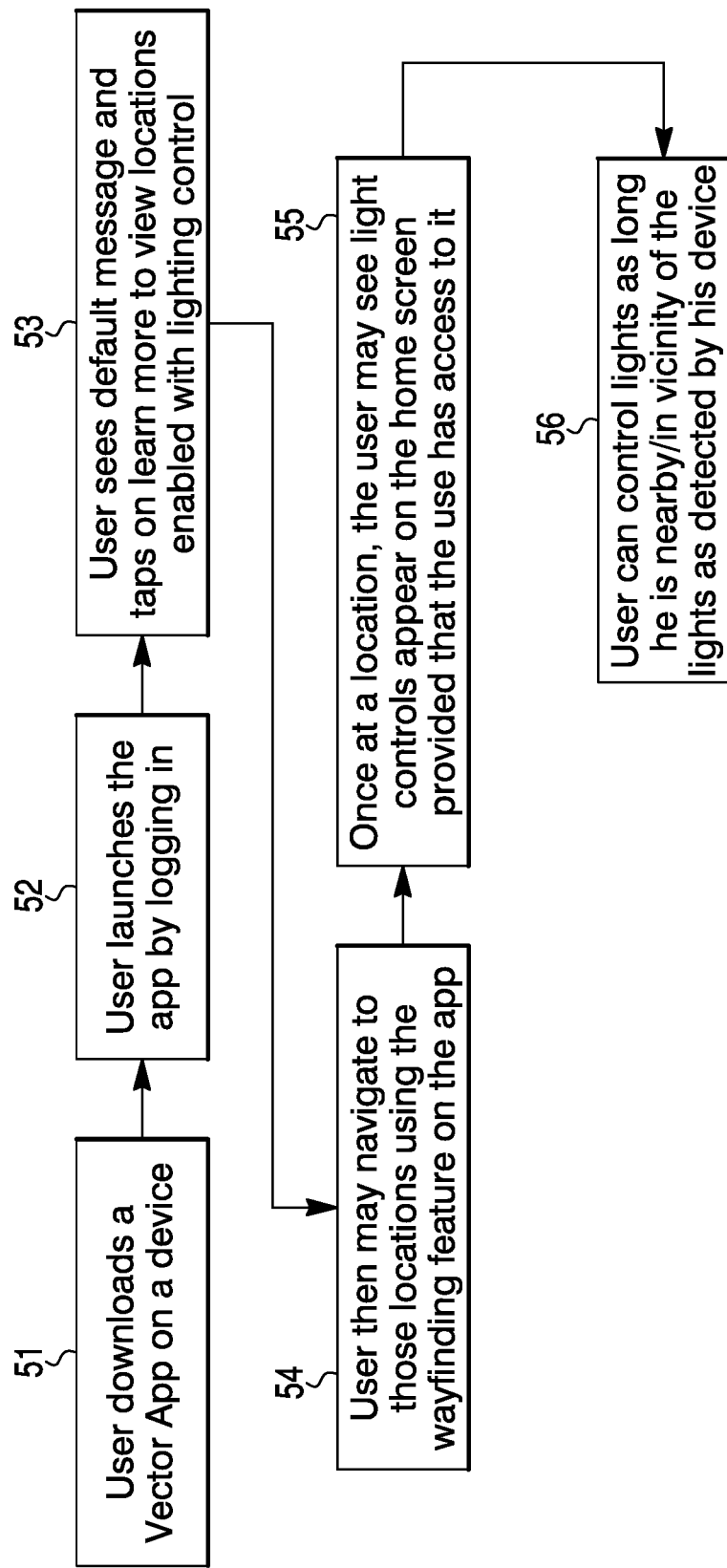
FIG. 15 is a diagram of user flow for contextual lighting control.

FIG. 15 is a diagram of user flow for contextual lighting control. In step 51, a user may download a Vector app on a device (e.g., a cell phone). The user may launch the app by logging in, as indicate by step 52. User may see a default message and tap on "learn more" to view locations enabled with lighting control, in view of step 53. At step 54, the user may then navigate to those locations using a wayfinding feature on the app. According to step 55, once at a location, the user may see light controls appear on the home screen provided that the user has access to it. As shown by step 56, the user may then control lights as long the user is nearby or in a vicinity of the lights as detected by his device.

To recap, a lighting control system may incorporate a mobile device, a first signal circuit connected to the mobile device, a lighting controller connected to the first signal circuit, one or more lighting fixtures that are controllable connected to the lighting controller, and one or more beacons. Connections may be wire or wireless. The one or more lighting fixtures may provide visual light communication or information to the mobile device. The one or more beacons broadcast signals that may be detected for location by the mobile device. One or more controls of the one or more light fixtures, respectively, may appear on a display when the mobile device is capable of receiving light directly from the one or more light fixtures.

Two or more light fixtures may be separately controllable when the mobile device receives light directly from one light fixture at a time.

Individual controls of the one or more light fixtures may be indicated on a map in the display of the mobile device even in absence of capability of controlling any of the one or more light fixtures by the mobile device.

Restricted access to control one or more light fixtures may be remotely provided, when the mobile device is absent from the area of the one or more light fixtures, through a use of a map on the display covering the area incorporating the one or more light fixtures.

The first signal circuit may convey information of authorization, location or light control to the lighting controller. The lighting controller may provide power to the one or more lighting fixtures in a controllable area.

The system may further incorporate a second signal circuit connected to the first signal circuit. The second signal circuit may contain user, space or lighting fixture management information for the first signal circuit.

The first signal circuit and second signal circuit may be situated in a cloud.

The mobile device may contain a display which is configured to show controllable lighting fixture areas.

If the mobile device can be under a controllable lighting fixture area, controls for adjusting brightness of the controllable lighting fixtures may appear on the display.

A set of the controls may be for adjusting preset values of brightness, or selecting patterns of one or more controllable lighting fixtures according to brightness.

A set of controls may be for adjusting one or more parameters of controllable lighting fixtures.

The one or more parameters may be selected from a group having intensity, color and dispersion. The controllable lighting fixtures may be selected from a group having light fixtures that can emanate various intensities, and light fixtures that can emanate various colors, and light fixtures that can emanate various dispersions of light.

An approach for controlling light may incorporate connecting, via a wire or wireless medium, a mobile device to an information module, connecting the information module to a lighting controller, connecting the lighting controller to one or more light fixtures, and positioning a mobile device for receiving light directly from a light fixture of the one or more light fixtures to result in a set of one or more controls on a display of the mobile device for adjusting one or more parameters of the light fixture. The information module may incorporate authorization, location and light control from the mobile device to be provided to the lighting controller.

The one or more parameters may be selected from a group incorporating intensity, wavelength and dispersion of light.

The approach may further incorporate launching a navigation application with the mobile device in a non-controllable light area or a controllable light area.

The navigation application may be further used to expand a portfolio of controls of buildings including controls of one or more light fixtures in the buildings.

The navigation application may provide indoor or outdoor navigation with the mobile device, which uses GPS-like technology and an interactive map to enable a user of the mobile device to find a way to a given town and a selected building among a complex of buildings in the town. The navigation application may be used to navigate to a designated place, space or room within the selected building that has one or more light fixtures that are controllable.

A lighting control arrangement may incorporate a web portal connected to a first signal module, a second signal module connected to the first signal module, a lighting controller connected to the second signal module, and one or more lighting fixtures connected to the lighting controller. The first signal module may incorporate user, space and light fixture management information. The second signal module may incorporate authorization, location and light control information. One or more controls of the one or more light fixtures, respectively, may appear on a display when the mobile device is capable of receiving light directly from the one or more light fixtures.

The one or more beacons broadcast location signals to the mobile device. The one or more lighting fixtures may provide visual light communication or information to the mobile device.

The mobile device may incorporate a navigation application with GPS-like technology that receives the location signals from the beacons and calculates a position of the mobile device relative to a position of the beacons, and develops a map of positions of controlled and uncontrolled light fixtures relative to the mobile device.

A computer and software stack level may incorporate a cloud as a secure, scalable infrastructure for collecting, aggregating and storing data, allowing connected "things" to communicate, offering/SaaS solutions available, IaaS/PaaS, and data lakes.

Software type may involve connected/connectivity, an offering available through a cloud or direct, remote connection (SaaS) and may cover infrastructure enabling connected services (Sentience).

There may an IoT with a stack level incorporating a cloud resulting in secure, scalable infrastructure for collecting, aggregating and storing data, allowing connected "things" to communicate, offering/SaaS solution available, IaaS/PaaS, and data lakes.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A lighting control system comprising:
   a mobile device;
   a first signal circuit connected to the mobile device;
   a second signal circuit connected to the first signal circuit;
   a lighting controller connected to the first signal circuit;
   one or more lighting fixtures that are controllable connected to the lighting controller; and
   one or more beacons; and
   wherein:
   connections are wire or wireless;
   the one or more lighting fixtures provide visual light communication or information to the mobile device;
   the one or more beacons broadcast signals that are detected for location by the mobile device; and
   one or more controls of the one or more light fixtures, respectively, appear on a display when the mobile device is capable of receiving light directly from the one or more light fixtures;
   the first signal circuit conveys information of authorization, location, or light control to the lighting controller; and
   the second signal circuit contains user, space or lighting fixture management information for the first signal circuit.

2. The system of claim 1, wherein two or more light fixtures are separately controllable when the mobile device receives light directly from one light fixture at a time.

3. The system of claim 1, wherein individual controls of the one or more light fixtures can be indicated on a map in the display of the mobile device even in absence of capability of controlling any of the one or more light fixtures by the mobile device.

4. The system of claim 1, wherein restricted access to control one or more light fixtures can be remotely provided, when the mobile device is absent from the area of the one or more light fixtures, through a use of a map on the display covering the area incorporating the one or more light fixtures.

5. The system of claim 1, wherein:
   the lighting controller provides power to the one or more lighting fixtures in a controllable area.

6. The system of claim 1, wherein the first signal circuit and second signal circuit are situated in a cloud.

7. The system of claim 6, wherein the mobile device contains a display which is configured to show controllable lighting fixture areas.

8. The system of claim 7, wherein if the mobile device can be under a controllable lighting fixture area, controls for adjusting brightness of the controllable lighting fixtures appear on the display.

9. The system of claim 7, wherein a set of the controls is for adjusting preset values of brightness, or selecting patterns of one or more controllable lighting fixtures according to brightness.

10. The system of claim 7, wherein a set of controls is for adjusting one or more parameters of controllable lighting fixtures.

11. The system of claim 10, wherein:
    the one or more parameters are selected from a group comprising intensity, color and dispersion; and
    the controllable lighting fixtures are selected from a group comprising light fixtures that can emanate various intensities, and light fixtures that can emanate various colors, and light fixtures that can emanate various dispersions of light.

12. A method for controlling light comprising:
    connecting, via a wire or wireless medium, a mobile device to a first module connected to a second module;
    connecting the first module to a lighting controller;
    connecting the lighting controller to one or more light fixtures; and
    positioning the mobile device for receiving light directly from a light fixture of the one or more light fixtures to result in a set of one or more controls on a display of the mobile device for adjusting one or more parameters of the light fixture; and
    wherein:
    the first module comprises authorization, location, and light control from the mobile device to be provided to the lighting controller; and
    the second module comprises user, space, and light fixture management information.

13. The method of claim 12, wherein the one or more parameters are selected from a group comprising intensity, wavelength and dispersion of light.

14. The method of claim 12, further comprising launching a navigation application with the mobile device in a non-controllable light area or a controllable light area.

15. The method of claim 14, wherein the navigation application is further used to expand a portfolio of controls of buildings including controls of one or more light fixtures in the buildings.

16. The method of claim 15, wherein:
    the navigation application provides indoor or outdoor navigation with the mobile device, which uses GPS-like technology and an interactive map to enable a user of the mobile device to find a way to a given town and a selected building among a complex of buildings in the town; and
    the navigation application is used to navigate to a designated place, space or room within the selected building that has one or more light fixtures that are controllable.

17. A lighting control arrangement comprising:
    a web portal connected to a first signal module;
    a second signal module connected to the first signal module;
    a lighting controller connected to the second signal module; and
    one or more lighting fixtures connected to the lighting controller; and
    wherein:
    the first signal module comprises user, space and light fixture management information;
    the second signal module comprises authorization, location and light control information; and
    one or more controls of the one or more light fixtures, respectively, appear on a display when a mobile device is capable of receiving light directly from the one or more light fixtures.

18. The arrangement of claim 17, further comprising:
    one or more beacons; and
    wherein:
    the one or more beacons broadcast location signals to the mobile device; and
    the one or more lighting fixtures provide visual light communication or information to the mobile device.

19. The arrangement of claim 18, wherein the mobile device comprises a navigation application with GPS-like technology that receives the location signals from the beacons and calculates a position of the mobile device relative to a position of the beacons, and develops a map of positions of controlled and uncontrolled light fixtures relative to the mobile device.

* * * * *